Dec. 25, 1928.
G. W. STEDWELL
1,696,738
LIQUID DELIVERY SYSTEM
Filed May 9, 1928
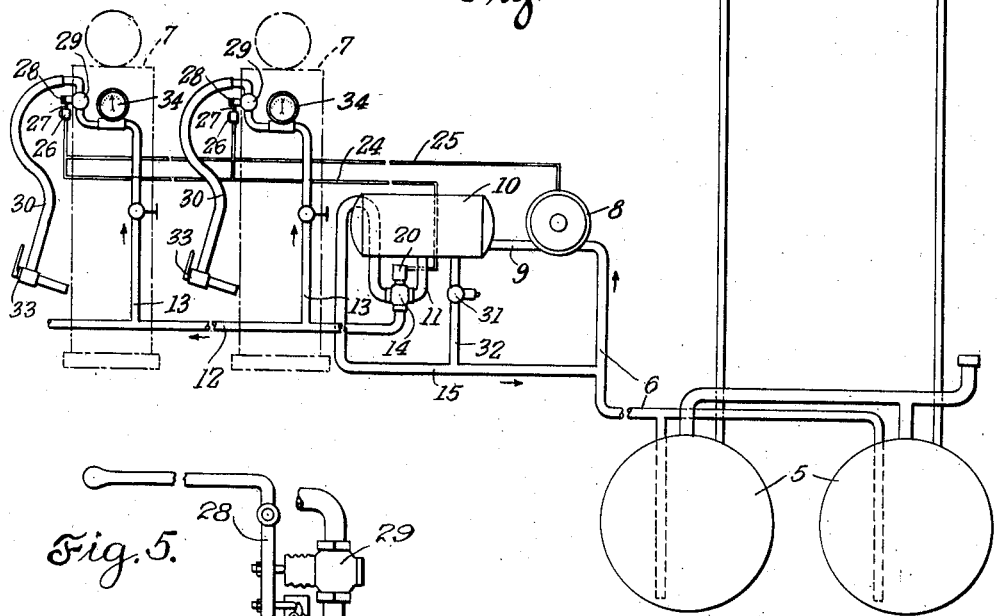
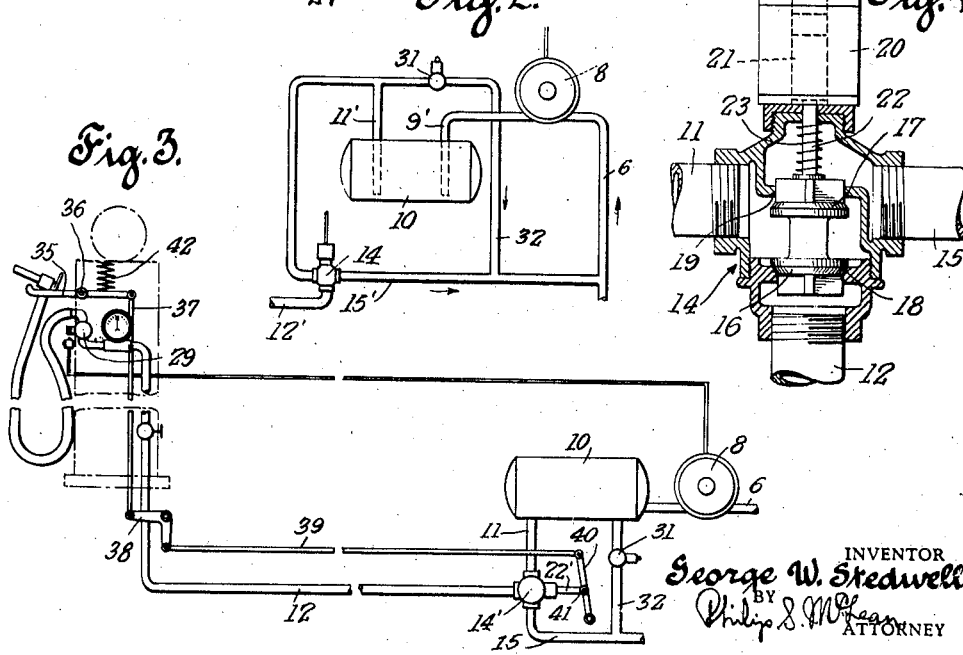
INVENTOR
George W. Stedwell
BY
Philip S. McLean
ATTORNEY Patented Dec. 25, 1928.

1,696,738

UNITED STATES PATENT OFFICE.

GEORGE W. STEDWELL, OF BROOKLYN, NEW YORK, ASSIGNOR OF ONE-HALF TO FRANCIS SHERIDAN, OF NEW YORK, N. Y.

LIQUID-DELIVERY SYSTEM.

Application filed May 9, 1928. Serial No. 276,266.

This invention relates to the delivery and dispensing of liquids, and particularly such as gasolene and the like.

Special objects of the invention are to enable the delivery of the liquid continuously and smoothly in any desired quantities, with a minimum of apparatus, by a simple pumping action, to automatically relieve pressure on the system after each delivery is completed, and to protect the system at all times against excessive pressure.

The foregoing and other desirable objects are attained by certain novel features of construction, combinations and relations of parts, as will appear in the following specification.

The drawing accompanying and forming part of the specification illustrates certain practical embodiments of the invention, but it is to be understood that the structure may vary from the present disclosure without departure from the true spirit and broad scope of the invention as hereinafter defined and claimed.

Fig. 1 is a broken and partly diagrammatic view of a gasolene dispensing system having the invention incorporated therein; Fig. 2 is a broken and partly diagrammatic view of the pump and pressure portion of the apparatus modified by having the lines entered into the top of the tank instead of into the bottom as in Fig. 1; Fig. 3 is a view similar to Fig. 1 but illustrating mechanical in place of the electrical apparatus employed in Fig. 1. Fig. 4 is a broken, part sectional view of the solenoid valve used in Figs. 1 and 2. Fig. 5 is an enlarged broken detail of the combined valve and switch mechanism.

Considering first the disclosure of Fig. 1, there is shown a two delivery stand system supplied from storage tanks 5 by a pipe line 6.

The transfer of liquid from the storage tanks to the delivery stands 7 is effected by an electric pump 8 interposed in the supply line 6. This pump delivers through pipe 9 into an auxiliary or pressure tank 10 from which the liquid flows by pipes 11, 12 to the branches 13 of the several stands.

In the delivery line of piping between the pressure tank and the stands, there is interposed a three-way valve 14, operative to establish flow from the pressure tank to the stands through pipes 11, 12, or to relieve pressure on the system by opening up communication between the pressure tank and the storage tanks through pipes 11, 15, 6. The construction of this three-way valve may vary, but a structure particularly suited for the purpose is shown in Fig. 4, where there is illustrated a valve element having oppositely directed valve faces 16, 17 arranged to cooperate respectively with valve seats 18, 19, controlling flow through pipes 11, 12 from the auxiliary tank to the stands or through pipes 11, 15, from the pressure tank back to storage.

In the first form of the invention illustrated, the three-way valve is shown as operated by a solenoid 20 having a movable core 21 directly connected with the stem 22 of the valve, said solenoid acting against the force of the valve closing spring 23.

In the particular form of the invention shown in Fig. 1, the solenoid valve and the electric pump are simultaneously operated through electric connections 24, 25 from a switch 26 at each stand, which switches have actuating members 27 positioned in the path in the handles 28 of the hose valves 29, from which it will be seen that as the control valve 29 at a delivery stand is turned to admit liquid into the hose 30, the switch 26 at the stand will be actuated to close energizing circuits through the solenoid valve and through the pump motor. Consequently, the pump will be set in operation and at the same time communication will be established between the pressure tank and the supply line running to the stands. Pressure will be thereby built up in the tank 10, the value of which may be governed by an automatic pressure relief valve 31 interposed in a by-pass 32 extending from the tank to the return line 15 and forming a relief way from the pressure tank independent of the three-way valve. With pressure in the hose lines, the delivery of liquid may be controlled by nozzle valves or the like as shown at 33, and hence any desired quantities of liquid may be delivered with a continuous flow and in measured quanties as shown by the meters 34 in the branches 13 leading to the hoses. The actual delivery may be controlled by the nozzle valves, which, operated either independently or in conjunction with the meters may be employed to fill a tank or to furnish any desired quantity of liquid. When the delivery is completed, the supply to the hose is cut-off and pressure on the system is automatically released by simply turning the control valve 29 at the stand, which by the one act shuts off supply to the hose and breaks the pump and solenoid circuits so as to stop the pump, close off the delivery line 12 and relieve the pressure from the tank back through the piping 11, 15 to the storage tanks. Thus in the act of shutting off the stands, the delivery pump is shut off, and at the same time all the pressure on the system is released. The hose line however is kept filled by the closing of valve 16, so that liquid is maintained in the delivery line 12 ahead of the liquid coming from the pump. Thus no time is lost in charging the delivery line each time the pump is started and there is no trapping of air in the line.

The delivery of liquid in the pressure tank by the pump traps a certain amount of air in that tank above the liquid therein, which acts as a cushion, regulating the flow of liquid into the tank and placing a certain "head" temporarily, on the liquid passing through the delivery line to the stands.

Trapping of air for the air cushion in the pressure tank may be effected either by a construction such as shown in Fig. 1, where the pipes directly enter the lower portion of the tank, or by a construction similar to that shown in Fig. 2, where the supply pipe 9' and the delivery pipe 11' are entered in the top of the tank and extend down to near the bottom of the same, the result being in each case that a body of air will be trapped and compressed in the upper portion of the tank above the entrances to the supply and delivery pipes, and that this air cushion will assist in maintaining the delivery flow smooth and continuous. The pressure relief "safety" valve 31 is shown in this instance connected with the delivery line instead of being connected directly into the tank as in Fig. 1.

The construction illustrated in Fig. 3 is the same generally as that first shown, the main distinction being that the pressure relieving valve 14' is mechanically operated instead of electrically operated. The mechanical connections shown for effecting the automatic operation of the pressure relieving valve comprise a nozzle hook 35 pivoted on the stand at 36 and having a link 37 pivotally connected with the rearward end of the same, said link being pivoted to one arm of a bell crank lever 38, whose other arm is connected by link 39 with a pivoted lever 40 having a pivotal connection at 41 with the valve stem 22'. A spring 42 is shown acting on the rearward extension of the nozzle hook to rock this hook in such a way as by the connections described to pull the valve stem outwardly in the same manner that the solenoid acts in the first disclosure, to thus open up the delivery line 11, 12 and close off the return line 15. Thus as soon as the nozzle is taken off the hook for delivery purposes, the pressure relieving valve will be automatically operated to connect up the pressure tank with the stand and as the stand valve 29 is turned to couple up the hose, the pump will be started to supply the liquid under pressure into the delivery line. As soon as the delivery is completed and the nozzle is restored to the hook, the three-way valve will be automatically returned to its initial position closing the delivery line 12 and relieving the pressure from the delivery tank back to the storage tank.

The invention it will be seen requires but a comparatively small sized delivery or pressure tank and a pump which need only be slightly in excess of that required for supplying a full flow to the delivery stand or stands, the pressure accumulating in the delivery tank serving to maintain an even continuous delivery flow, and any excess pressure automatically by-passing back to storage. When not in service, the entire system is automatically freed of pressure and the liquid in the delivery line is trapped to be in readiness at the head of the next delivery flow. The system therefore is entirely safe as regards the matter of pressure and the action is quick and positive.

By regulating the pressure relief valve 31, it will be seen that the system may be set to operate at any desired pressure.

What is claimed is:

1. In liquid delivery systems, the combination with a supply line and a delivery line, of pump means for transferring liquid from the supply line to the delivery line, means for controlling discharge from the delivery line means for arbitrarily starting the pump when a delivery is to be made and for stopping the pump when the discharge is completed and bypass means automatically operable after each delivery for relieving the pressure in the delivery line and for by-passing excess flow away from the delivery line said latter means including a bypass in connection with the delivery line and continually open to the supply line when the pump is not transferring liquid from the supply to the delivery side of the apparatus.

2. In liquid delivery systems, the combination with a supply line and a delivery line, of means for transferring liquid from the supply line to the delivery line, means for controlling discharge from the delivery line and means automatically operable for relieving the pressure in the delivery line and for by-passing excess flow away from the delivery line, said latter means including a by-passing pressure relieving valve in the delivery line and operating connections therefor controllable at the discharge end of the delivery line.

3. In liquid delivery systems, the combination with a supply line and a delivery line, of means for transferring liquid from the supply line to the delivery line, means for controlling discharge from the delivery line and means automatically operable for relieving the pressure in the delivery line and for by-passing excess flow away from the delivery line, said latter means including a by-passing pressure relieving valve interposed in the delivery line and a return connection therefrom back to the source of liquid supply and remote control connections for said pressure relieving valve operable at the point of discharge of the delivery line.

4. In liquid delivery systems, the combination with a supply line and a delivery line, of means for transferring liquid from the supply line to the delivery line, means for controlling discharge from the delivery line, means automatically operable for relieving the pressure in the delivery line and for by-passing excess flow away from the delivery line, said latter means including a by-passing pressure relieving valve in the delivery line and operating connections therefor controllable at the discharge end of the delivery line and a pressure delivery tank in the delivery line between the liquid transfer means and the pressure relieving valve.

5. In liquid delivery systems, the combination with a supply line and a delivery line, of means for transferring liquid from the supply line to the delivery line, means for controlling discharge from the delivery line, means automatically operable for relieving the pressure in the delivery line and for by-passing excess flow away from the delivery line, said latter means including a by-passing pressure relieving valve interposed in the delivery line, a return connection therefrom back to the source of liquid supply, remote control connections for said pressure relieving valve operable at the point of discharge of the delivery line and a pressure delivery tank in the delivery line between the liquid transfer means and the pressure relieving valves.

6. In a liquid delivery system, the combination of a storage tank, a pressure tank, a pump for transferring liquid from the storage tank to the pressure tank, a delivery line connected with the pressure tank, means for controlling discharge from the delivery line, a pressure relieving return line and valve mechanism for closing the return line and connecting the delivery line with the pressure tank or closing the delivery line and connecting the pressure tank with the return line and control connections for said valve mechanism operable from the discharge point of the delivery line.

7. In a liquid delivery system, the combination of a storage tank, a pressure tank, a pump for transferring liquid from the storage tank to the pressure tank, a delivery line connected with the pressure tank, means for controlling discharge from the delivery line, a pressure relieving return line and valve mechanism for closing the return line and connecting the delivery line with the pressure tank or closing the delivery line and connecting the pressure tank with the return line and a pressure relief valve operable in connection with the pressure tank for relieving the pressure independently of the action of the first mentioned valve.

8. In a liquid delivery system, the combination of a storage tank, a pressure tank, a pump for transferring liquid from the storage tank to the pressure tank, a delivery line connected with the pressure tank, means for controlling discharge from the delivery line, a pressure relieving return line and valve mechanism for closing the return line and connecting the delivery line with the pressure tank or closing the delivery line, connecting the pressure tank with the return line and control connections for said valve mechanism operable from the discharge point of the delivery line and a pressure relief valve operable independent of the first mentioned valve to relieve the pressure in the pressure tank.

9. In liquid delivery systems, a supply line, a pressure tank, a delivery line extending from the pressure tank, a pump in the supply line, valve means for controlling the discharge from the delivery line, a pressure by-passing line and a pressure relieving valve connected with the delivery line and with said by-pass line, said valve being operable to close the delivery line and establish communication between the pressure tank and by-pass or to close the by-pass and establish communication between the pressure tank and the delivery line.

10. In liquid delivery systems, a supply line, a pressure tank, a delivery line extending from the pressure tank, a pump in the supply line valve, means for controlling the discharge from the delivery line, a pressure by-passing line and a pressure relieving valve connected with the delivery line and with said by-pass line, said valve being operable to close the delivery line and establish communication between the pressure tank and by-pass or to close the by-pass and establish communication between the pressure tank and the delivery line and means for substantially simultaneously effecting the operation of the pump and the positioning of the valve to close the by-pass and establish communication between the tank and delivery line or to stop the pump and effect operation of the valve to close the delivery line and open the tank to the by-pass line.

11. In liquid delivery systems, a liquid supply line, an air trapping pressure tank connected therewith, a pump in said liquid supply line, a delivery line extending from the tank and provided with means for controlling discharge therefrom, a by-pass pressure relieving line, valve means controlling alternative communication between the tank and the delivery line or by-pass line and means for conjointly controlling operation of the pump and of said valve means.

12. In liquid delivery systems, a liquid supply line, an air trapping pressure tank connected therewith, a pump in said liquid supply line, a delivery line extending from the tank and provided with means for controlling discharge therefrom, a by-pass pressure relieving line, valve means controlling alternative communication between the tank and the delivery line or by-pass line, means for conjointly controlling operation of the pump and of said valve means, a storage tank, the supply line and by-pass line being connected with said storage tank and an independent pressure relief valve also having a return connection to the storage tank.

13. In liquid delivery systems, a liquid supply line, an air trapping pressure tank connected therewith, a pump in said liquid supply line, a delivery line extending from the pressure tank and provided with means for controlling discharge therefrom, means for arbitrarily starting and stopping the pump for delivery purposes and independently of the pressure in the pressure tank and a by-pass open from the pressure tank back to the supply line after each pump operation to automatically relieve pressure in the delivery side of the system when no delivery is being made.

14. In liquid delivery systems, the combination with a storage tank, an air trapping pressure tank, a delivery stand, a supply line from the storage tank to the pressure tank, a delivery line from the pressure tank to the delivery stand, a pump for effecting transfer of liquid from the storage tank to the pressure tank, arbitrarily operable control means at the delivery stand for starting the pump each time a delivery is to be made and vent means constantly open when the pump is not operating for automatically venting pressure in the delivery line after each delivery use of the same.

15. An uninterrupted flow pressure venting liquid delivery system, comprising in combination, a storage tank, liquid delivery connections extending from said storage tank and including an air trapping pressure tank interposed in said connections, a pump for transferring liquid through said connections from the storage tank to the air trapping pressure tank, valve means at the discharge end of the delivery connections, means for starting the pump each time a delivery of liquid is to be made to effect a desired transfer of liquid from the storage tank to the air trapping pressure tank and vent means open when the delivery valve is closed for automatically venting residual fluid under pressure in the air trapping pressure tank back to the storage tank to thereby take the pressure off the delivery connections after each delivery of liquid.

In testimony whereof I affix my signature.

GEORGE W. STEDWELL.